United States Patent [19]

Rauschdorf

[11] Patent Number: 4,801,235

[45] Date of Patent: Jan. 31, 1989

[54] DEVICE FOR HANDLING WORKPIECES

[75] Inventor: Ludwig Rauschdorf, Bad Rappenau/Obergimpern, Fed. Rep. of Germany

[73] Assignee: Firma August Läpple GmbH & Co., Fed. Rep. of Germany

[21] Appl. No.: 147,741

[22] Filed: Jan. 25, 1988

[30] Foreign Application Priority Data

Jan. 24, 1987 [DE] Fed. Rep. of Germany ....... 3702108

[51] Int. Cl.$^4$ .............................................. B65H 1/00
[52] U.S. Cl. .................................. 414/225; 414/733; 414/917
[58] Field of Search ............... 414/680, 222, 225, 685, 414/729, 696, 697, 917, 733; 74/42, 43, 46, 103

[56] References Cited

U.S. PATENT DOCUMENTS

| 1,766,573 | 6/1930 | Westin | 414/733 |
|---|---|---|---|
| 2,528,670 | 11/1950 | Sebesta | 414/680 |
| 3,528,563 | 9/1970 | Alley et al. | 414/680 X |
| 3,680,881 | 8/1972 | Douglas | 74/103 X |
| 3,703,968 | 11/1972 | Uhrich et al. | 414/680 |
| 3,757,962 | 9/1973 | Chavet | 414/680 |
| 3,850,307 | 11/1974 | Motoda | 414/680 X |
| 3,902,606 | 9/1975 | Rönbeck | 414/733 |
| 4,302,139 | 11/1981 | Malish | 414/680 X |
| 4,502,588 | 3/1985 | Whiteside et al. | 414/680 X |
| 4,515,519 | 5/1985 | Bachmann et al. | 414/680 |
| 4,585,389 | 4/1986 | Watanabe et al. | 414/225 X |
| 4,589,819 | 5/1986 | Shirao | 414/225 X |
| 4,621,562 | 11/1986 | Carr et al. | 414/729 X |
| 4,635,493 | 1/1987 | Buckley | 414/917 X |
| 4,749,324 | 6/1988 | Rulison | 414/680 X |

FOREIGN PATENT DOCUMENTS

| 2477939 | 9/1981 | France | 414/680 |
| 0011559 | 1/1977 | Japan | 414/680 |
| 0191528 | 10/1984 | Japan | 414/729 |

Primary Examiner—Leslie J. Paperner
Assistant Examiner—Jennifer L. Doyle
Attorney, Agent, or Firm—McGlew and Tuttle

[57] ABSTRACT

A motor driven device for transferring workpieces between two stations possesses a holding device for the workpieces arranged on the lower end of a lever linkage. This linkage comprises an operating lever, which at its top end articulates with a crank lever, which pivots about a stationary crank lever axis. The center part of the operating lever articulates with the free end of a guide lever which at its other end pivots about a stationary guide lever axis under the crank lever axis. During transfer motion the linkage runs through a center position, in which the guide lever, the upper lever arm of the operating lever and the upwardly directed crank lever are on a straight line. At one stationary lever axis there is a driven shaft which is keyed to the lever thereat. In order to ensure a defined motion through the center position there is a guide member on the operating lever which in the center position abuts against a stationary guide member arranged on the straight line and which so actuates the operating lever via the guide member that the operating lever performs a movement symmetrical in relation to the straight line.

18 Claims, 6 Drawing Sheets

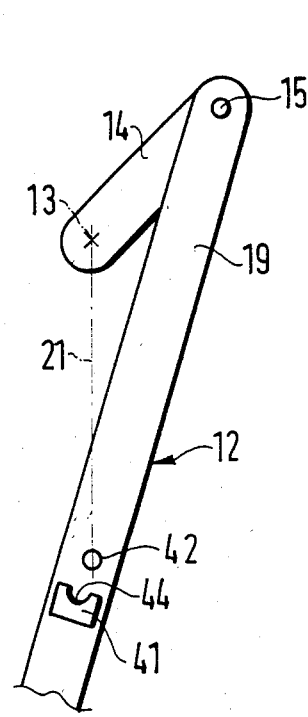
FIG.5a
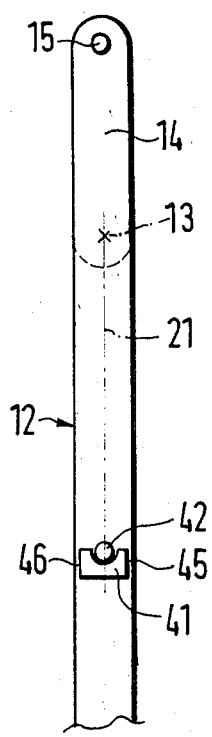
FIG.5b
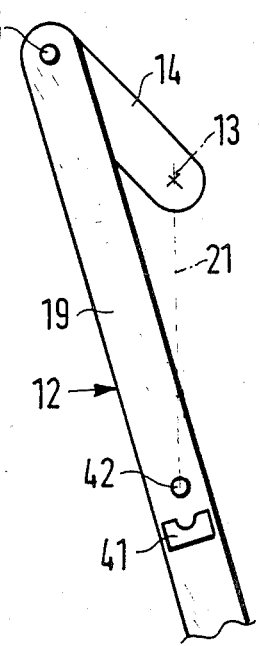
FIG.5c
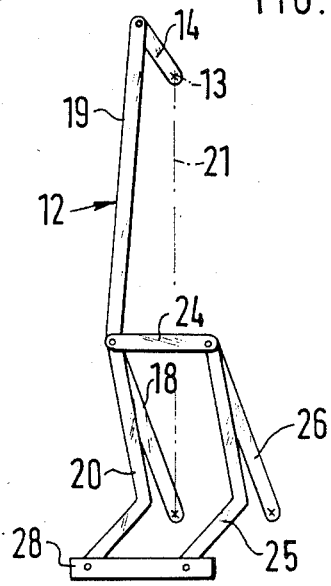
FIG.6
FIG.7

DEVICE FOR HANDLING WORKPIECES

BACKGROUND OF THE INVENTION

The present invention relates to a motor driven device for handling or transferring workpieces between two stations, and more especially for inserting and/or removing workpieces in and from a processing machine, as for example a press, comprising a holding device for the workpiece, which performs a vertical motion adjacent to the repective stations and a longitudinal movement therebetween.

During the production of workpieces they have to be sequentially placed in the respective processing machine and then removed from it again after they have been treated in some way. For this purpose and for the linking together of adjacent machines, in which the workpieces are sequentially machined so that they have to be transferred from one machine to the next, it is necessary to provide loading and unloading devices as well of the above-mentioned type, whose holding means, which may for instance be of the type using a gripping or suction unit, hold the workpieces at least during the transfer motion and, dependent on the particular application, for example in connection with a press, during processing in the machine as well.

In order to provide for the vertical motion of the workpieces desired for transfer at the ends of the stroke and for the longitudinal motion between such vertical strokes, it is possible to equip the devices with a number of drive means each responsible for motion along one coordinate. Such devices or systems, as for example those employing cams has follower rollers and/or slide operating means are however complex and involve the use of guide members subject to wear.

SHORT SUMMARY OF THE PRESENT INVENTION

One object of the invention to create a device of the initially specified type which in structure is simple and is cheap to produce.

A further aim of the invention is to provide such a device which is practically free of wear-prone parts and may be designed for workpieces having a great weight.

More especially the invention is to make possible the use of a technically simple driving means which only requires a control or operating system with a low degree of complexity.

A further aim of the invention is to provide a system ensuring optimum control of the velocity, i.e. great acceleration and rapid braking at the ends of the strokes, this being an important factor for the automation of lines of machines.

In order to achieve these or other objects in the invention the holding means is arranged at the lower end of a linkage which has an operating lever extending upwards from the holding means and whose opposite upper end articulates with the free end of a crank lever pivoting about a stationary crank lever axis and whose center part is articulated with the free end of a guiding lever whose other end is able to pivot about a stationary guiding lever axis (which is arranged under the crank lever axis and parallel thereto) so that during transfer motion the linkage passes through a center position in which the guiding lever axis, the pivot axis connecting the guiding lever with the operating lever, the crank lever axis and the axis connecting the crank lever with the operating lever are on a straight line in this sequence, there being a shaft which is at a stationary guiding lever axis, is connected with the associated lever and is driven by the drive means, and a guide member is arranged on the operating lever, preferably between the two articulation axes so the that guide member projects out of the lever plane and in the center setting runs against a stationary counter guide member which is arranged on a straight line connected the guiding lever axis and the crank lever axis and by way of the guide member actuates the operating lever on moving through the center setting so that the operating lever performs a movement symmetrical in relation to the straight line.

Such a lever linkage makes possible a transfer motion with the holding means in a lowered setting at the ends of the stroke. In this respect the lever linkage may be designed for loads of more or less unlimited weight simply by making the levers with suitable cross sections. Furthermore comparatively few individual parts are needed so that the costs of manufacturing the device are low. a further point is that only strictly rotary or swinging motion takes place so that the device operates with a minimum of wear. For operation it is only necessary to have a rotary shaft at one of the stationary axes, which shaft is connected with the drive device which may be an electrical, hydraulic or pneumatic drive motor. Such rotary drive means are available in the art in a large number of different designs. They are simple and may be readily controlled.

On moving through the center setting there are indefinite conditions since on continuous turning of the crank lever through the center setting the operating lever is then able to move past on one or the other side of the crank lever axis. However with respect to the crank lever axis it is necessary for the operating lever to change sides, since the holding means would otherwise return to the starting point. It is for this reason that the device is provided with the guide member on the operating lever and with the associated stationary counter guide member with which it is possible to ensure a defined passage through the center setting.

One working example of the invention will now be described in detail with reference to the accompanying drawings so as to indicate further convenient developments and advantages of the invention.

LIST OF THE SEVERAL VIEWS OF THE DRAWINGS

Figure 1:
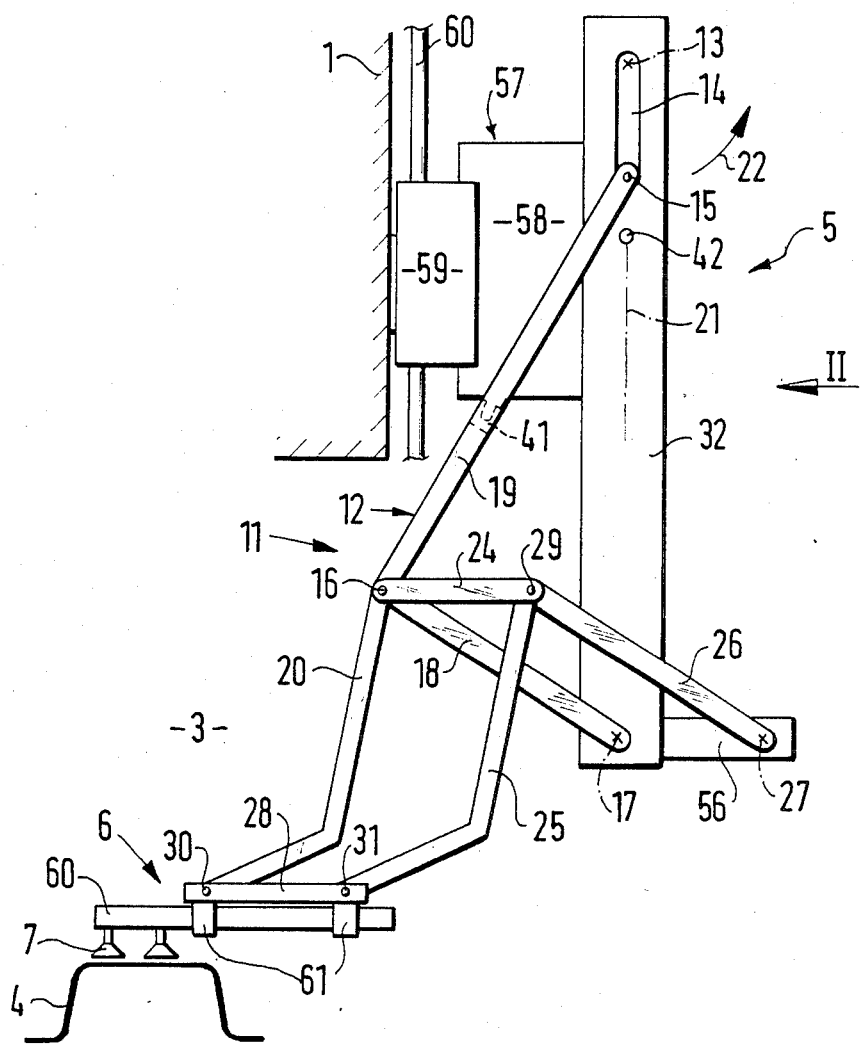
FIG. 1 is a side view of a device according to the invention as seen diagrammatically and looking in the direction of the arrow marked I in FIG. 2.
Figure 4A:
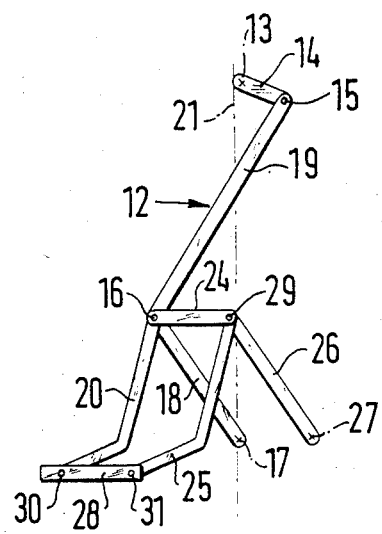
Figure 4B:
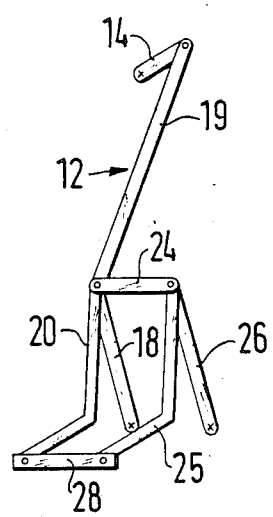
Figure 4C:
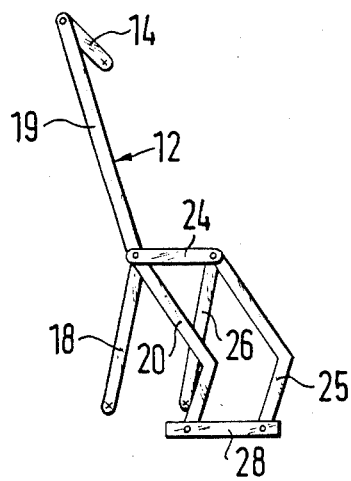
Figure 4D:
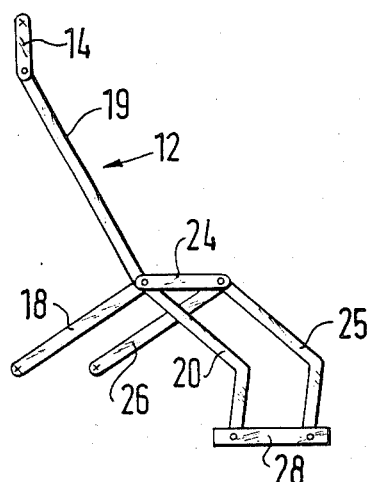

FIGS. 4a to 4d respectively show a side view of the lever linkage in which starting with the one terminal setting as shown in FIG. 1 the successive intermediate positions moved through will be seen, together with the opposite terminal position as shown in FIG. 4d.

FIGS. 5a to 5c show the crank lever and the operating lever as partial views on a large scale prior to reaching the center setting (in FIG. 5a this setting will be seen to correspond generally to the setting of FIG. 4b) and in the center setting or after passing through it (FIG. 5c showing this setting corresponding generally to the setting of FIG. 4c).

FIG. 6 shows one possible intermediate setting, which is theoretically possible, of the lever linkage during the course of motion as shown in FIG. 4, such setting being avoided owing to the provision of the guide member and the counter guide member.

Figure 3:
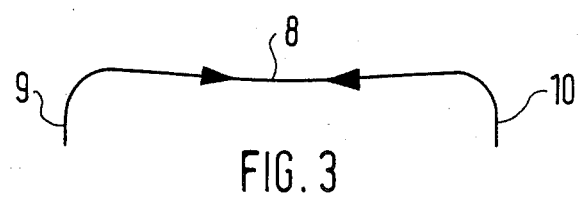
FIG. 3 shows the preferred path of motion of the holding means, which is obtained with the device as shown in FIGS. 1 and 2.

FIG. 7 shows the path of motion described by the guide member during performance of the reciprocating stroke of the holding means as shown in figure 3.

Figure 8:
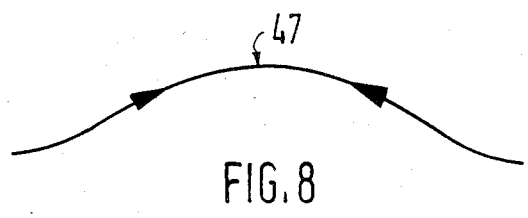

FIG. 8 shows a different path of motion of the holding means able to be described by the same lever linkage.

Figure 9A:
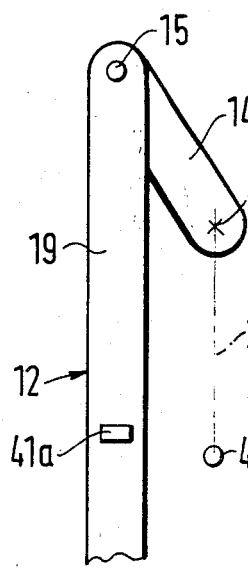
Figure 9B:
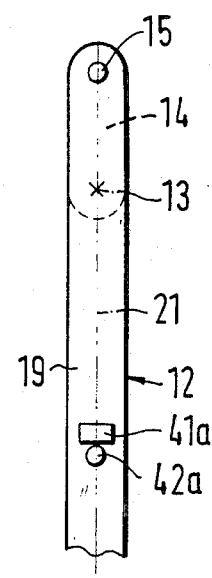
Figure 9C:
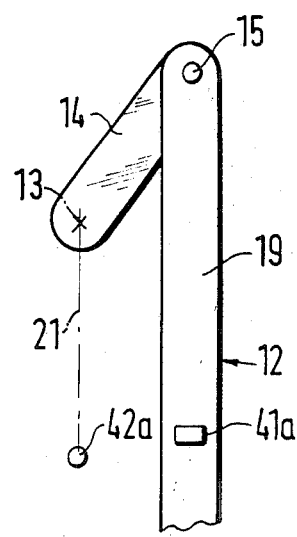

FIGS. 9a to 9c show the crank lever with the operating lever in a partial view prior to reaching the center setting or shortly after such setting, when the holding means is moved along the path of motion shown in FIG. 8 to the right, the guide member arranged on the operating lever being varied.

Figure 10:
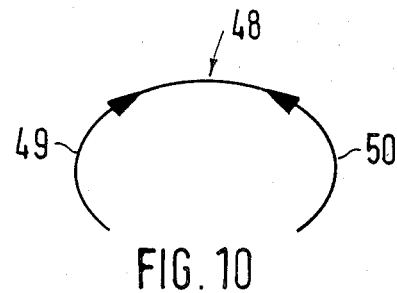

FIG. 10 shows the motion of the guide member (shown in FIG. 9) during motion of the holding means (as shown in FIG. 8) away from the guide member.

Figure 11:
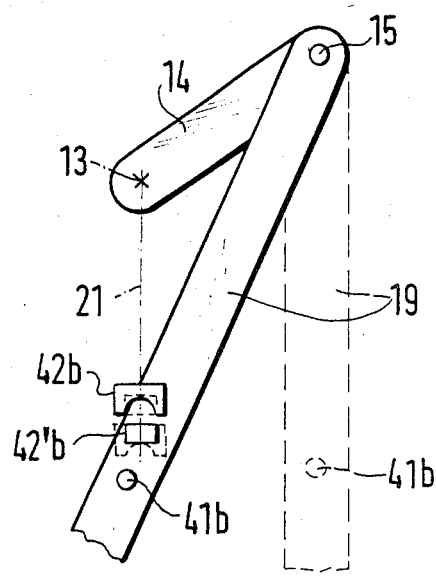

FIG. 11 is a view of a lever linkage corresponding to FIGS. 5 and 9 whose holding means moves along the path in the one direction as shown in FIG. 3 and in the opposite direction moves along the path indicated in FIG. 8 there accordingly being two stationary counter guiding members.

Figure 12:
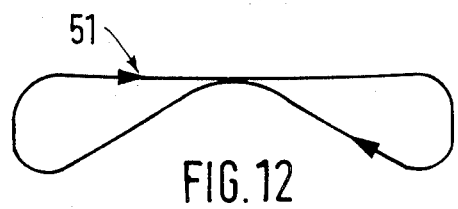

FIG. 12 shows the path of motion of the holding means with different path sections for the two directions of motion, such path being composed of the paths of motion indicated in FIGS. 3 and 8.

Figure 13:
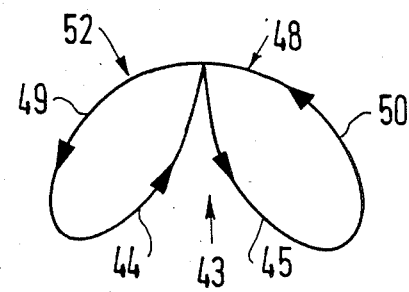

FIG. 13 shows the path described by the guide member during motion of holding means as indicated in FIG. 12.

Figure 14:
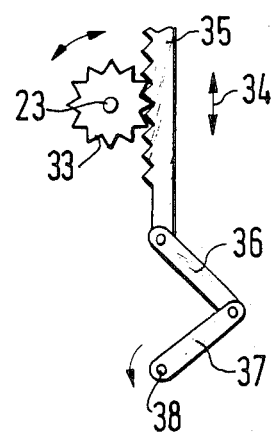

FIG. 14 shows an embodiment of the invention relating to the conversion of a continuous rotation of the drive device into an oscillatory motion of the driven shaft of the lever linkage.

DETAILED ACCOUNT OF THE INVENTION

FIG. 1 diagrammatically shows the top part 1 and the lower part 2 together with the processing space 3, placed therebetween, in which the workpieces 4 are formed by the pressing tool. In order to remove the workpiece 4 from the press or for the preceding insertion of the unprocessed workpiece into the press there is a device 5 which is placed in front of the upper part 1 of the press. It will be clear that the device 5 might also be used in conjunction with other processing machines besides presses in all cases in which workpieces have to be transferred between two stations. The device 5 comprises a holding means 6 for holding the respective workpiece 4 during the transfer motion, such holding means being for example in the form of a gripping device (not shown) or a suction device, of which only the sucker 7 engaging the workpieces is shown. The path of motion described by the holding means 6 and thus by the workpiece 4 during transfer is indicated in FIG. 3. It is composed of a center path section 8, in which the holding means 6 performs a longitudinal motion with a length equal to the distance between the two stations and of a vertical section 9 and 10 respectively at the two ends of the center path section 8, in which the holding device 6 performs and upward and downward motion. The transition from the center path section 8 to the generally perpendicularly extending vertical sections 9 and 10 is curved. During the motion along the center path section 8 the holding means 6 is lowered a small distance, this not being of any further relevance. In FIG. 1 the workpiece 4 has just been processed and it is still in place. Furthermore the holding means 6 is in the processing space 3 and has been moved into engagement with the workpiece 4. The holding means 6 thus assumes the terminal position shown in FIG. 3 on the bottom left. If the device 5 is put into operation, the workpiece 4 will firstly be lifted along the vertical path section 9, then moved generally horizontally along the center path section 8 out of the press and to the next station, as for example in the case of a series of machines which are linked together, following which it is moved along the vertical path section 10. The holding means 6 then releases the workpiece and is moved back along the path of motion as indicated in FIG. 3 to fetch the next workpiece. Dependent on the design of the holding means and the type of workpiece processing to be carried out, the holding means may hold the workpiece during processing as well.

The holding means 6 is attached to the lower end of a lever linkage 11. The latter comprises an operating lever 12 extending upwards from the holding means 6 in an upward direction, and the upper end of the operating lever 12 remote from the holding means 6 articulates at 15 with the free end of a pivoting crank lever 14 turning about a stationary crank lever axis 13.

The stationary lever axes are marked in FIG. 1 by a cross and the pivot axes moving in space are symbolized by a circle.

The operating lever 12 extending from the holding means 6 as far as the pivot axis 15 articulates in its center section 16 with the free end of a guide lever 18, which at its other end pivots about a stationary guide lever axis. The stationary guide lever axis 17 is located at a lower level than the stationary crank lever axis 13 and is in fact preferably vertically thereunder. The pivot axis 16 divides the operating lever 12 into an upper lever arm 19 and a lower lever arm 20. The lower operating lever arm 20 is cranked towards the press in order to be able to be more within the processing space 3. At the pivot axis 16 the operating lever 12 is slightly cranked towards the opposite side.

All the axes of the lever linkage are parallel to each other. It is furthermore to be understood that the different levers extend in parallel planes such that they do not obstruct each other.

The lower end of the operating lever 12, adjacent to which the holding means 6 is arranged, describes the same path of motion as the holding means (FIG. 3). The path of motion will be apparent from FIG. 1 in conjunction with FIGS. 4a through 4d:

In the initial position as shown in FIG. 4 the crank lever 14 extends along the imaginary straight line 21, which passes through the stationary crank lever axis 13 and the stationary guide lever axis 17 in a downward direction. If the terminal position of the molding means 6 is located somewhat further up than is indicated on the stroke section 9, it is possible for the linkage motion to be caused to commence with the crank lever 14 somewhat twisted in the counter-clockwise direction. If now the drive device, which is yet to be described, is started, the guide lever 18 will swing in the clockwise direction towards the line 21, while the crank lever 14 turning about the stationary crank lever axis 13 will pivot away from this line in the opposite direction (as indicated by the arrow 22). When this takes place the lower end of the operating lever 20 will be lifted along the stroke section 9 and then diverted into the center path section 8. The center path section 8 starts generally at that point in time when the crank lever 14 has turned through an angle of around 90 degrees from the line 21. This position is generally reached in the FIG. 4a. In FIG. 4b the lower end of the operating lever 20 moves along the center path section 8 in the half of it adjacent to the starting position. During the course of the further motion the linkage 11 will move through a center setting in which the crank lever 14 extends along the line 21 upwards. In this center position (which is attained between the positions shown in FIGS. 4b and 4c) the stationary guide lever axis 17, the lever axis 16 connecting the guide lever 18 with the operating lever 12 and moving in space, the stationary crank lever axis 13 and the articulation axis 15 connecting the crank lever 14 with the operating lever 12 and moving in space lie in this order on the straight line 21. After moving through the center position the crank lever 14 will be on the opposite side of the stationary crank lever axis 13 (see FIG. 4c), at which time the guide lever 18 as will rocks out of its position on the line 21 in the center position further away from this line 21 in the same direction in which it previously moved towards the line 21. Once the crank lever 14 has rocked through an angle of around 270 degrees out of its starting position as indicated in FIG. 1, the lower end of the operating lever 12 is deflected into the stroke section 10. Its lower end will be reached when the crank lever 14 has performed a full rotation and is directed downwards again (FIG. 4d). Dependent on the height at which this terminal position is to be located, it is possible for the linkage motion to be terminated as well before the crank lever 14 has arrived at the line 21. The transfer motion is then terminated. During such motion the crank lever 14, the guide lever 18 and the operating lever 12 (of the articulation axis 16, respectively) perform a symmetrical motion in relation to the line 21. On retraction of the holding means 6 out of the terminal position at the end of the stroke section 10 into the starting position at the end of the stroke section 9 there is the same motion of the linkage in the opposite direction so that all in all there is a motion along the path shown in FIG. 3 in both directions.

In order to increase the strength or stability of the lever linkage and in order to provide more space for the arrangement of the holding means 6, at the articulation axis 16 between the operating lever 12 with the guide lever 18 there is furthermore a pivoting connecting lever 24, which at the other end articulates with the upper end of a second operating lever 25 and the free end of a second guide lever 26, which at the other end pivots about a stationary guide lever axis 27 in such a manner that two articulated parallelograms are formed with a common connecting lever 24, of which the first parallelogram is formed by the connecting lever 24, the lever arm 20 extending downwards from it of the first operating lever 12, the second operating lever 25 and a holding lever 28 connecting the lower ends of the two operating levers 12 and 25 and the second articulated parallelogram is constituted by the connecting lever 24 and the two guide levers 18 and 26, whose stationary guide lever axes 17 and 27 are arranged at a distance corresponding to the length of the connecting lever 24.

The term lever length is obviously used in the present context in the sense of the distance between the two axes on it. The length of the connecting lever 24, that is to say the distance between the articulation axis 16 on the operating lever side and the opposite articulation axis 29, at which the connecting lever 24 is connected with the second operating lever 25 and the second guide lever 26, is thus equal to both the length of the holding lever 28, that is to say the distance between the articulation axes 30 and 31, at which the holding lever 28 is connected with the first operating lever 12 and, respectively, with the second operating lever 25, and also to the distance between the stationary axis 17 of the first guide lever 18 and the stationary axis 27 of the second guide lever 26; the connecting lever 24, the holding lever 28 and the line between the two guide lever axes 17 and 27 run parallel to each other and in this respect preferably at a right angle to the line 21, which is drawn through the stationary crank lever axis 13 and the stationary axis 17 of the first guide lever 18. In practice the device will generally be so arranged that the line 21 extends vertically so that the connecting lever 24, the holding lever 28 and the distance line between the stationary guide lever axes 17 and 27 extend on the level.

Furthermore the distance between the articulation axes 16 and 30, at which the first operating lever 12 is connected with the connecting lever 24 and the first guide lever 18 or, respectively, the first operating lever 12 connected with the holding lever 28, corresponds to the distance between the two articulation axes 29 and 31, at which the connecting lever 24 is connected with the second control lever 25 and with the second guide lever 26 and furthermore the second control 25 is connected with the holding lever 28, these two lines, which independently of the form of the lower lever arm 20 of the first operating lever 12 and of the second operating lever 25 taken separately may be termed the lengths of such levers, extend parallel to each other. In the present embodiment of the invention the lower lever arm 20 of the first operating lever 12 and the second operating lever 25 extend parallel to each other as well.

It will be clear that the two guide levers 18 and 26 are equal in length and are parallel to each other.

The second articulated parallelogram 16, 17, 27 and 29 with the respective levers 18, 24 and 26 might also be termed a guiding articulated parallelogram or a parallelogram linkage and the first articulated parallelogram 16, 30, 31 and 29 with the respective levers 20, 24 25 and 28 may be termed the operated or driven articulated parallelogram or parallelogram linkage.

The pivoting motion of the second parallelogram linkage, that is to say of the two guide levers 18 and 26 with the connecting lever 24, is dictated by the two stationary guide lever axes 17 and 27. If in the case of the first operating lever 12 the upper lever 19 were to be absent, it would be possible for the two operating levers 12 (in this case its lower lever arm 20) and 25 with the holding lever 28 to perform a free swinging motion about the articulation axes 16 and 29 on the connecting lever 24. This is avoided by the extension of the first operating lever by its upper lever arm 19 and its upper pivot point on the crank lever 14. Owing to this the first operating lever 12, the second operating lever 25 and the holding lever 28 perform controlled motion, that is to say along the path indicated in FIG. 3.

The lower lever arm 20 of the first operating lever 12 and the second operating lever 25 are longer than the two guide levers 18 and 26 so that during all of the transfer motion the holding means 6 will be lower than the stationary guide lever axes 17 and 27 and thus lower than the housing 32 carrying the linkage and which will be described later. This obviously also applies for any case in which the connecting lever 24, the operating lever 25 and the second guide lever 26 are omitted.

When in the above description and in the following text the term holding lever 28 is used, this wording does not have to be restricted to a lever linkage or the like. The term holding lever is rather taken to mean other structures such as plates on which the holding means 6 might be mounted.

The lever linkage as described 11 comprises only purely rotary pivots so that the rate of wear of the device is extremely low. For driving the lever linkage 11 it is only necessary to provide a shaft driven by the driving means and connected with a lever of the system turning about one of the stationary lever axes 13, 17 and 18. In the present working example of the invention the crank lever 14 is mounted on the driven shaft 23, through whose center the crank lever axis 13 runs concentrically. The driving means for the shaft 23 (the drive means is indicated in broken lines at 24 in FIG. 2) may be any of a number of means known to those in the art. The drive means may be electric, hydraulic or pneumatic. Since such means are well known no discussion thereof is deemed necessary. The terminal positions of the rotary motion of the driven shaft 23, that is to say the terminal positions of the transfer motion, may be very simply adjusted or controlled in such drives. The same also applies for the speed changes during the transfer motion. This transfer motion should on the one hand be very rapid but on the other hand braking should take place at the ends of the stroke. Such drive systems are know, as has been indicated.

In the case of the above described transfer motion the holding means 6 describes the same path in both directions, as is indicated in FIG. 3. This means that the driven shaft 23 as well performs an oscillating motion. As noted, during the transfer of the holding means 6 out of the position indicated in FIG. 1 into the position shown in FIG. 4d the crank lever 14 turns counter-clockwise (as indicated by the arrow 22), while during return motion of the holding means it turns in a clockwise direction. From the point of view of driving systems it is expedient in this respect if the oscillating motion of the drive shaft 23 is derived from a drive shaft turning in the same direction. Such a possibility is shown diagrammatically in FIG. 14. Here is a gear wheel 33 is keyed on the drive shaft 23 and is in mesh with a rack 35 guided for linear motion as indicated by the double arrow 34. This rack is driven by means of a crank drive and articulates with a connecting rod 36 whose other end articulates with a crank 37. The other end of the crank 37 is keyed on a drive shaft 38, rotating in the same direction, such shaft being turned by a motor. For one complete revolution of the crank 37 the rack 35 performs one reciprocating stroke.

For conversion of the rotary motion the design is expediently such that at one of the stationary lever axes 13, 17 and 27, which are in any case present, there is a shaft on which the respective lever is keyed, which carries operating means for operation or control of the drive means. In working example of the invention shown such an operating shaft 39 is arranged at the stationary axis 17 (axis line) of the first guide lever 18. An operating element in the form of a cam is indicated at 40. The operating signal receiving means or signal producers are not indicated in the drawing in order to simplify it. The operating data may be detected by other means, as for example means responding to rotary motion. The signals are then passed to the drive device 24.

As described the device is driven via a single driven shaft 23, which at the same time defines a stationary lever axis. However the features described so far are not sufficient to ensure a defined motion along the path of FIG. 3. If the lever linkage is in the center position in which the axes 17, 16 13 and 15 lie on the line 21 in this order, there will in fact be different relationships. In fact the lever linkage is not only able to move into the position as indicated in FIG. 4c, in which the upper lever arm 19 of the first operating lever 12 crosses the line 21 so that the articulation axis 16 is on the other side of the line 21 to the articulation axis 15, but also into the position as shown in FIG. 6. In the case of the motion described with reference to FIG. 4 the upper lever arm 19 of the first operating lever 12 will cross over the line 21 prior to reaching the center position in the one direction and after moving through the center position in the opposite direction. The other possibility is such that although there is the same movement as far as the center position, after this the upper lever arm 19 of the first operating lever 12 is entirely on the side of the line 21, on which the articulation axis 16 was to be found prior to reaching the center position. Putting this in different words one may say that during the above described movement the first guide lever 18 moves from one side of the line 21 to the other on moving through the center position and on doing so turns further in the same direction of rotation, while in the case of the other possibility the first operating lever 18 changes its direction of rotation in the center position and then rocks back to the same side of the line 21, as will be clearly seen by consulting FIGS. 4c and 6, which show the same linkage with the crank lever 14 in the same position. If after moving through the center position the lever linkage were to assume the possible position as indicated in FIG. 6, the linkage and thus the holding means 6 as well as would return to the initial position as indicated in FIG. 1. The holding means 6 would thus experience a reversal of direction half way along the path of motion shown in FIG. 3 and move back along a somewhat different path.

In order to avoid this the operating lever 12 is suitably guided in the center position so that the lever linkage is then moved in the desired direction. For this purpose there is a guide member 41 projecting from the plane of the lever 12 and attached thereto preferably between the two articulation axes 15 and 16, that is to say preferably on the upper lever arm 19. The guide member runs up against a stationary counter guide member 42 in the center position. This counter guide member 42 is arranged on the straight line 21 passing through the operating lever axis 17 and the crank lever axis 13 and acting by way of the guide member 41 so guides the operating lever 12 moving through the center position that the operating lever 12 performs a motion which is symmetrical to the straight line 21.

This is illustrated in FIG. 5 in conjunction with FIG. 21. In the view of FIG. 5 corresponding to FIGS. 1 through 4 and 6 the guide member 41 and the counter guide member 42 are admittedly under the plane of the drawing and are as such covered by the operating lever 12, for better understanding however the guide member 41 and the counter guide member 42 are drawn in full lines so that one has to assume that the operating lever 12 is transparent and in a phantom view.

The guide member 41 is located on that point on the operating lever 12 which during the desired transfer motion *course of motion as in FIG. 4) moves along a upwardly converging path 43 of motion (FIG. 7) with inwardly curved path halves 44 and 45 in the center position. In this respect the guide member 41 moves generally on the line 21 upwards and then leaves the line 21 generally tangentially downwards. In FIG. 5a, in which positions are generally the same as that of FIG. 4b, the guide member 41 is somewhat further from the counter guide member 42. In the center position as shown in FIG. 5b the guide member 41 abuts the counter guide member 42 in such a manner that the operating lever 12 is prevented for then moving into the position as shown in FIG. 6. For this purpose the guide member 41 has a guide slot or similar recess 44 which is open upwards and towards the counter guide member 42 and in the case of the present embodiment of the invention this slot is rounded off recess, into which the counter guide member 42 fits. The arrangement might also be a reversed one so that the recess is not on the guide member but on the counter guide member, it however being open in a downward direction in this case so that the guide member of the operating lever may plunge into it. In the illustrated example of the invention the counter guide member 42 is a simple pin, which in order to avoid frictional forces during change in direction of the operating lever may carry a roller. In the case of the reverse arrangement when the counter guide member has a recess, it is possible for the guide member to be a pin, possibly provided with a roller.

During the desired motion out of the center position as indicated in FIG. 5b into the lever setting as shown in FIG. 6 the guide member would move away at a right angle to the line 21. This is prevented by a recess wall 45 in the guide member. The guide member 41 may thus still leave the counter guide member in a downward direction so that the desired swinging of the operating lever 12 takes place along the line 21 (see FIG. 5c). During the reverse motion of the linkage out of the position as indicated in FIG. 4d into the position as shown in FIG. 1 there is a reverse motion through the center setting, the other wall 46 of the recess in the guide member then taking effect. If the guide recess is arranged on the counter guide member, the walls of the recess will be on the counter guide member and will take effect in the same manner but with a bilaterally symmetrically reversed manner.

This type of motion is always an advantage if a vertical stroke is desired at the ends of the horizontal longitudinal motion of the holding means, as is shown in FIG. 3. If this feature is of less importance, the device may also be operated so as to perform a different type of motion, this being made possible by the different lever relationships in the center position. If one starts with the position shown in FIG. 1, it is possible for the drive shaft 23 to also be driven in a direction of rotation opposite to the direction of the arrow 22. The lever linkage then arrives at the position indicated in figures 6 and 9a prior to arriving in the center setting. In this respect the upper lever arm 19 of the operating lever 12 will move past the side which is nearer the starting position of the stationary crank lever axis 13 prior to reaching the center position. In the case of this modified form of the course of motion it is possible to ensure that in the center position the lever linkage then moves with the course of motion as indicated above, since the lever linkage would otherwise move via the position as shown in FIG. 4b and then the position as in FIG. 4a into the initial position as in FIG. 1. This in turn is ensured inasfar as a guide member 41a is arranged on the upper lever arm 19 so as to project out of the lever plane, such member being arranged on the operating lever 12 preferably between the articulation axes 15 and 16. In the center position this guide member 41a runs against a stationarily arranged counter guide member 42a, which is arranged on the straight line 21 passing through the stationary crank lever axis 13 and the stationary guide lever axis 17 and which via the guide member 41a operates the operating lever 12 on passing through the center position so that the operating lever 12 performs a movement symmetrical in relation to the straight line 21. After moving through the center position the upper lever arm 19 of the operating lever 12 will be on the other side of the line 21 and does not move across it. FIG. 9c shows the position achieved after passage through the center position (FIG. 9b) and the end position as shown in FIG. 4d is then reached from this setting. It will be seen from this that all in all the holding means 6 generally follows the path 47 of motion appearing from FIG. 8, this path differing from the path indicated in FIG. 3. For return motion of the lever linkage into the first position as indicated in FIG. 1 the direction of the turning of the driven shaft 23 is reversed. Then the holding means 6 moves back along the same path 47 of motion.

The drive and operation of the drive shaft 23 are similar to that described but with the difference that the direction of rotation is reversed, when the holding means 6 is to be moved from the first to the second station or in the opposite direction. In the case of the second possible form of operation the guide member 41a moves along a path 48 of motion which in the center position cuts the straight line 21 between the stationary crank lever axis 13 and the stationary guide lever axis 17 at a right angle as indicated in FIG. 10 with outwardly curved path halves 49 and 50. Accordingly in this case the guide member 41a and the counter guide member 42a are so designed and arranged in relation to each other that the guide member 41a swings from the side onto the top side of the counter guide member 42a on arriving in the center position so that the stationary guide counter member 42a forms an effective abutment for upward action the guide member 41a is not able to escape in a downward direction and accordingly the linkage is not able to return to the starting position. Thus the guide member 41a, slides past the counter guide member 42a as it were, that is to say the guide member 41a moves directly over the counter guide member 42a past the latter.

In FIGS. 9a to 9c is assumed that the operating lever 12 is again transparent or in a phantom view.

The path of motion indicated in FIG. 8 of the holding means also comprises a raised central part. However the curve has a gentler slope and the end parts are less steep, that is to say it is here a question more of a horizontal motion with a vertical component imposed thereon.

In both the cases described so far the guide member 41 or 41a, respectively, moves along the same path of motion during the motion of the holding means 6, this being the same as saying that the holding means passes on the same path out of the second station into the first one, on which path it has moved in the opposite from the first station into the second station. For this purpose it is necessary for the driven shaft 23 to be reversed in rotation at each station. In this respect the motion in the two directions amounts at the most each to one full turn of the drive shaft 23. It will be apparent that the angle of turning is correspondingly less than 360 degrees, if the path of motion as in FIG. 3 or FIG. 8 is not to be fully utilized. If the driven shaft were not to be arranged at the crank lever axis 13 but rather at the stationary guide lever axis 17 or at the stationary axis 27 of the second guide lever 26, the angle of turning would obviously be lesser in amount and the angle moved through by the guide lever 18 or 26, respectively, would be equal to this and then be less than 180 degrees.

A still further form of operation is possible which is a combination of the above described courses of motion. The arrangement may in fact be so operated that for example on the way from the first to the second station the path of motion as in FIG. 3 is followed and on the return the path of motion as in FIG. 8 is followed. There would then generally be a path 51 of motion as shown in FIG. 12. The upper half of this path 51 of motion is the same as the path of motion as indicated in FIG. 3 and the lower half is the same as in FIG. 8. The path 51 of motion is in the form of a loop, motion along it being possible in the direction of arrows indicated or in the opposite direction. In this case the driven shaft 23, which in the case of this form of the invention has to drive the crank lever 14, performs motion in the same direction of rotation so that the guide member 41b (FIG. 11) in the one direction moves along a pointed path 43 (see FIG. 7) and in the other direction moves along the path 48 (FIG. 10) cutting the straight line 21 at a right angle, two stationarily counter guide members 42b and 42'b being provided respectively associated with one of the paths 43 and 48 of motion of the guide member 41b, such counter guide members 42b and 42'b being able to be moved towards the operating lever 12 and away therefrom so as to take effect alternately. For the guide member 41b, which is again mounted on the upper lever arm 19 of the operating lever 12, there is then the path 52 indicated in its entirely in FIG. 13, whose individual sections are denoted by the references numerals of FIGS. 7 and 10 to facilitate comprehension. For the same guide member 41b on the outward motion on running through the center position, that is to say on the transition from the path section 44 to the path section 45, there is a counter guide member 42b and on the return motion on transition from the path section 50 to the path section 49 there is the other counter guide member 42'b. It will be clear that the path as marked in figure 13 may be moved along in the opposite direction as well. In appearance the counter guide member 42b is the same as the guide member 41 but it is removed from the operating lever 12 and is stationarily mounted in a manner opposite to the other counter guide member. The second counter guide member 42'b is the same as the guide member 41a, the latter also being clear of the operating lever and being arranged stationarily as a counter guide member. The guide member 41b may on the other hand be in the form of a single pin, preferably with a roller thereon. The counter guide member 42b is located at a higher level than the counter guide member 42'b. In order to ensure that the counter guide member 42'b does not obstruct the entry of the guide member 41b into the recess 44b in the counter guide member 42b on transition from the path section 44 into the path section 45 or vice versa, it is displaced clear of the operating lever 12 at this time and thus of no effect. During the return motion of the lever linkage when the guide member 41b is to be moved clear of the path section 50 into the path section 49 or vice versa, on the other hand the counter guide member 42b is moved away from the operating lever so that it is not able to obstruct the sliding motion of the guiding member 41b over the counter guide member 42'b.

In FIG. 11 with the same position of the crank lever 14 the operating lever 12 shown in full lines in a position corresponding to FIG. 5a and is shown in broken lines in a position corresponding to FIG. 9c.

The motion as in FIG. 3, FIG. 8 or FIG. 12 may be selected in accordance with the work to be performed by the device.

It will be clear that in each case the drive means may also be programmed. In the case of the path of motion as indicated in FIG. 12 the reciprocation of the counter guide members 42b and 42'b may be one of such control functions, even although it may not be a case of program control system.

In the case of the FIGS. 11 through 13 it would be possible to have two guide members on the operating lever, which would then be associated with one of the counter guide members. This would however not change the principle that the two counter guide members are arranged so that they are able to reciprocate and are only alternately effective.

Figure 2:
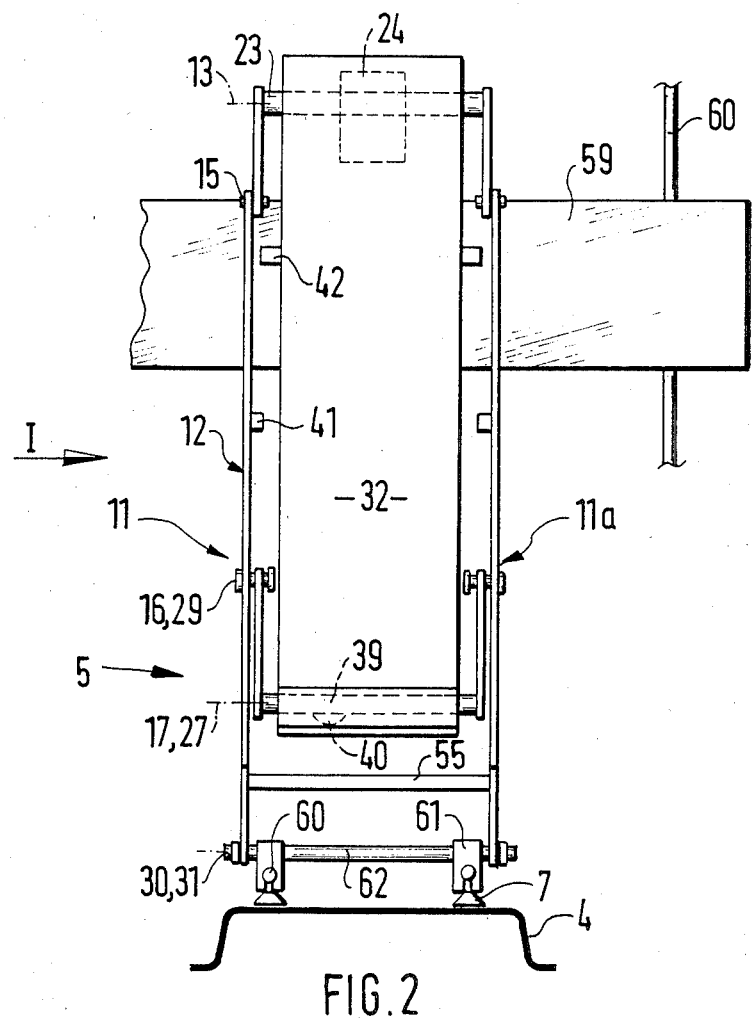
FIG. 2 is a front view of the device of FIG. 1 looking in the direction of arrow II in figure 1.

FIG. 2 serves to illustrate a further convenient feature of the invention in accordance with which the lever linkage 11 described is arranged on one side of a carrying and drive housing 32 carrying the two lever linkages 11 and 11a and accommodating the drive means 24 and on the other side thereof there is a similar lever linkage 11a, the two lever linkages 11 and 11a being ganged for synchronous motion. Owing to the equivalence of the two lever linkages the second one 11a is not described here. In FIGS. 1, 4 through 6, 9 and 11 it is placed under the plane of the drawing so as to be aligned with the linkage able to be seen. The connection for linking motion may be by way of pivot pins extending from one linkage to the other if the housing 32 is not in the path of motion, with the aid of stationary lever shafts and/or with the aid of transverse struts 55 or the like placed between equivalent levers in the two linkages 11 and 11a. It is also convenient if the drive shaft 23 extends between the two lever linkages 11 and 11a.

Owing to the present of the two linkages 11 and 11a a particularly sturdy device results that may even be used for the heaviest loads. In this respect the same drive device may be used as is the case with a single lever linkage. The housing 32 located between the two lever linkages 11 and 11a and which in addition top the drive means may also contain the control or operating means (as for instance the operating shaft), will not interfere with the transfer of the workpieces, since it will always be located above the holding means 6. As a bearing means for the stationary shaft 27 of the second guide lever 26 of the two lever linkages 11 and 11a it is possible to have a shelf 56 mounted on the housing 32.

The term housing 32 as used hereinbefore is intended obviously also to mean a device part without any walls.

In accordance with a further convenient feature of the invention the device as described is arranged on a cross slide-like mounting device 57. The main part of the latter is a first slide 58 mounted on the housing 32 or an other suitable part of the system and which is able to be shifted (in the present instance horizontally) and which is mounted on a second slide 59, which may be moved at a right angle to the first slide, that is to say in the present instance vertically, by a lead screw drive 60 for instance. Such cross slide arrangements are well known so that the two slides 58 and 59 are only indicated diagrammatically. The drawing furthermore does not include the attachment of the mounting device with the slides 58 and 59 on the respective machine.

In the present instance the vertically traveling slide 59 extends horizontally like a portal structure or gantry over the processing space 3 along the length of the machine, in the present instance a press. It is in this manner that using the slides 58 and 59 the holding means 6 may be moved to practically any position in the processing space 3. With the aid of the carriages 58 and 59 it is furthermore possible to perform motions for adjusting the position of workpieces or shifting and stacking them.

The holding means 6 is preferably attached in removable manner on the lever linkage or linkages 11 and 11a so that adaptation to the respective workpieces and to other features is possible. In this respect the holding device 6 may comprises at least one holding rod attached by means of a plug-in and gripping connection, such rod being able to hold the suction member 7 or the like. In the present working example there are two such holding rods 60, which are respectively secured by means of gripping members 61. In this respect the gripping members 61 may be seated on axial pins 62 extending between the two lever linkages 11 and 11a in place of the articulation pins 30 and 31 and be plugged onto them. The gripping members 61 have a further recess, extending perpendicularly thereto for the respective holding rod 60 inserted thereinto, the plug in members being slotted adjacent to such recess so that the respective holding rod 60 may be locked in position by means of a clamping screw.

The holding means 6, and in the present instance preferably the holding rod 60 may furthermore be arranged to rock and/or turn so that its position may be adapted to the respective workpiece.

By way of further amplification it is to be noted that the counter guide members 42, 42a, 42b and 42'b are arranged on the housing 32 to as to project from the side thereof.

I claim:

1. A motor driven device for transferring workpieces between two stations comprising:
    a holding means which is able to move vertically adjacent to each of the stations and to perform a longitudinal motion therebetween,
    an operating lever,
    a crank lever,
    a guide lever,
    said three levers constituting a linkage in which the operating lever extends upwards from the holding means, to which it is attached at its lower end, so that the opposite upper end of said operating lever is articulated at a first pivot axis with a free end of the crank lever, the other end of said crank lever pivoting about a stationary crank lever axis and said operating lever having a center part pivotally connected at a second pivot axis with the free end of the guide lever, the other end of said guide lever pivoting about a stationary guide lever axis, said guide lever axis being arranged under the said crank lever axis and in parallelism thereto so that during transfer motion of a workpiece between stations the said linkage moves through a center position, in which
    the guide lever axis,
    the pivot axis connecting the guide lever with the operating lever,
    the crank lever axis and
    the pivot axis connecting the crank lever with the operating lever
    are arranged in this order along a straight line,
    a drive shaft connected with one of said levers and centered on one of said axes so as to rock said lever when it is turned, said drive shaft being adapted to be connected with a driving means,
    a guide member
    a counter guide member
    said guide member being arranged on said operating lever so as to protrude from a plalne defined by said lever so that in said center position said guide member abuts against said counter guide member, said counter guide member being arranged on a straight line passing through said guide lever axis and the crank lever axis and so moves the operating lever via the guide member that the operating lever performs a motion symmetrical in relation to the said straight line.

2. The device as claimed in claim 1 further comprising a holding lever, a connecting lever pivoted at one end thereof at the axis at which the operating lever and the guide lever are pivoted together, a second operating lever having an upper end thereof pivotally joined with the connecting lever at an opposite end thereof, a second guide lever with a free end articulating with the other end of the connecting lever, while an opposite end of the second guide lever is pivoted at a stationary guide lever axis, in such a manner as to form first and second articulated parallelograms with the connecting lever in common, said first articulated parallelogram being formed by the downwardly extending lever arm of the first operating lever, the second operating lever and the holding lever connecting the lower ends of the two operating levers and the second parallelogram being formed by the connecting lever and the two guide levers, whose stationary guide lever axes are arranged at a distance apart corresponding to the length of the connecting lever.

3. The device as claimed in claim 1 comprising two such lever linkages and a support drive housing with the two linkages arranged on opposite sides thereof, the two linkages being coupled together so as to move in synchronism.

4. The device as claimed in claim 3 wherein said drive shaft is arranged so as to extend fully between the two linkages.

5. The device as claimed in claim 1 comprising a shaft which is arranged at one of the stationarily arranged lever axes and has the respective lever thereat keyed thereto, and furthermore operating elements on this shaft for operating the drive means.

6. The device as claimed in claim 1 wherein the holding means is detachably and replaceably secured to such lever linkage.

7. The device as claimed in claim 6 wherein said holding means comprises at least one holding rod and a plug-in and gripping connecting means securing said holding rod.

8. The device as claimed in claim 1 wherein the holding means is arranged to turn about at least one of a number of axes arranged at angles to each other.

9. The device as claimed in claim 1 wherein at least on motion of the holding means in one direction said guide member is arranged to move along a path with path halves curving inwards and upwards towards each other, such path havles converging towards each other at an acute angle in a center part thereof.

10. The device as claimed in claim 1 wherein at least during motion of the holding means in one direction said guide member is arranged to move along a path of motion intersecting the straight line extending between the stationary crank lever axis and the stationary guide lever axis at a right angle, such intersecting path halves being curved outwards away from each other.

11. The device as claimed in claim 10 wherein said guide member is arranged to move along an identical path on motion of the holding means in both directions.

12. The device as claimed in claim 11 wherein one of said guide members has a guide recess therein into which said other guide member fits.

13. The device as claimed in claim 12 wherein said guide member is arranged to move directly past and over the counter guide member.

14. The device as claimed in claim 13 wherein said driven shaft is arranged to perform an oscillatory motion.

15. The device as claimed in claim 14 comprising a second drive shaft which is arranged to turn in one direction, and means for causing said second drive shaft to cause said first-mentioned drive shaft to oscillate.

16. The device as claimed in claim 9 wherein on motion of the holding means in either direction the driven shaft is arranged to perform a rotary motion in one direction so that the guide member moves along a path of motion which in the said one direction cuts the said straight line at an acute angle and in the other direction cuts it at a right angle, and said device additionally comprises two such counter guide members respectively associated with one respective one of the paths of motion of the guide member, such guide members being arranged to move towards and away from the operating lever alternatively between operative and inoperative positions.

17. An apparatus comprising a cross-slide-like means on which said device as claimed in claim 1 is mounted.

18. The device as claimed in claim 1 wherein said guide member is arranged between the two said pivot axes on said operating lever.

* * * * *